United States Patent Office 3,442,912
Patented May 6, 1969

3,442,912
SYNTHESIS OF AROMATIC EPOXIDES FROM TRIALKYLSULFONIUM SALTS
Melvin J. Hatch, Socorro, N. Mex., assignor to The Dow Chemical Company, Midland, Mich., a corporation of Delaware
No Drawing. Continuation-in-part of application Ser. No. 489,733, Sept. 23, 1965. This application Dec. 19, 1967, Ser. No. 691,713
Int. Cl. C07d 1/02
U.S. Cl. 260—348                                9 Claims

ABSTRACT OF THE DISCLOSURE

Reaction of a trialkylsulfonium salt (1) with an aromatic aldehyde (2) in the presence of a strong aqueous base provides a new synthesis of aromatic epoxides (3), e.g.:

$$(RCH_2)_3S^+X^- + ArCHO \xrightarrow[H_2O]{B} RCH\overset{O}{\underset{}{\diagup\diagdown}}CHAr$$
$$(1) \quad\quad (2) \quad\quad\quad\quad (3)$$

the aromatic epoxides including styrene oxide are useful as stabilizers, and in the synthesis of plasticizers, antioxidants and the like.

---

This is a continuation-in-part of application Ser. No. 489,733 filed on Sept. 23, 1965 by Melvin J. Hatch and now abandoned.

BACKGROUND

The formation of sulfonium ylides from certain sulfonium salts in a strongly basic, non-aqueous solution is known. For example, dimethylsulfonium methylide $$(Me_2S^+\!-\!CH_2^- \leftrightarrow Me_2S\!=\!CH_2)$$

is formed by reaction of trimethylsulfonium iodide with methylsulfinylcarbanion in dimethylsulfoxide. Such sulfonium ylides can react in the non-aqueous solution with certain carbonyl compounds to form epoxides. [Johnson & LeCount, J. Am. Chem. Soc., 83, 417 (1961); Corey & Chaykovisky, ibid., 84, 3782 (1962); Franzen & Driessen, Tetrahedron Letters, 661 (1962), Ber., 96, 1881 (1964)]. However, a similar reaction in aqueous solution has not been described even though it would have numerous advantages for industrial practice.

STATEMENT OF THE INVENTION

It has now been discovered that trialkylsulfonium salts will condense in a strongly alkaline aqueous solution with aromatic aldehydes to form an aromatic epoxide. More specifically a process has been discovered for preparing aromatic epoxides by reacting in aqueous solution: (A) a trialkyl-sulfonium salt of the formula:

$$(RCH_2)_3S^+X^-$$

where each R individually is H or $CH_3$, and X is a counteranion, (B) an aromatic aldehyde, ArCHO, and (C) a water-soluble base having a $pK_a$ greater than 11.0 to form (D) an aromatic epoxide of the formula:

$$RCH\overset{O}{\underset{}{\diagup\diagdown}}CHAr$$

where R is H or $CH_3$ and Ar is the aromatic group of the aldehyde. In a preferred embodiment the trialkylsulfonium salt and aromatic aldehyde are reacted in a heterogeneous mixture of water and a water-insoluble organic extractant which removes the aromatic epoxide from the aqueous phase as it forms.

The process is particularly useful in the preparation of aromatic epoxides not readily obtained by conventional epoxidation of olefinic groups. It permits the conversion of a wide variety of aromatic aldehydes into epoxides useful as scavengers for HCl or HBr and as stabilizers for chlorinated solvents (Dial U.S. Patent 3,025,331). The utility of these epoxides in the synthesis of phosphorous containing plasticizers, lubricants and softening agents (Kolka U.S. Patent 2,866,808) is just one example of their wide utility in the synthesis of numerous valuable compounds (Kirk-Othmer, "Encyclopedia of Chemical Technology" 2nd ed., vol. 8, Interscience, N.Y., 1965, p. 2388; M. S. Malinovskii "Epoxides and Their Derivatives," 1965).

REACTANTS

The process described herein involves a tri($C_1$–$C_2$ alkyl) sulfonium salt such as trimethylsulfonium iodide, triethylsulfonium chloride, or ethyldimethylsulfonium bromide. These trialkylsulfonium salts can be prepared by alkylation of a dialkylsulfide with methyl iodide, ethyl bromide, or other similar alkylating agents, in the manner described by Smutney et al. in U.S. Patent 3,101,265. Such trialkylsulfonium salts normally have a halide counteranion. However, the halide form can be converted when desired to other anionic forms such as the carbonate, nitrate, sulfate, acetate, perchlorate or tosylate by conventional ion-exchange techniques.

The process is limited in practice to aromatic aldehydes because of competing reactions with formaldehyde and other non-aromatic aldehydes. Suitable aromatic aldehydes include benzaldehyde, p-chlorobenzaldehyde, o-tolualdehyde, m-ethylbenzaldehyde, p-terephthalaldehyde, and α-napthaldehyde. Also the aromatic aldehydes can contain other substituent groups such as alkyl, halo, hydroxyl or alkoxyl groups which do not interfere with the desired condensation.

As indicated by Equation 1, the epoxidation $$(RCH_2)_3S^+X^- + ArCHO + B \longrightarrow$$
$$RCH\overset{O}{\underset{}{\diagup\diagdown}}CHAr + (RCH_2)S + HBX$$
(Eq. 1)

process requires at least 1 mole of base (B) per mole of sulfonium salt. The base should have a water-solubility of at least 0.1 weight percent and a $pK_a$ in aqueous solution higher than 11.0. Sodium hydroxide is preferred. However, other alkali and alkaline earth hydroxides or oxides such as potassium hydroxide, lithium oxide, barium hydroxide, calcium hydroxide, or calcium oxide, can be used.

In practice use of a moderate excess of base, e.g., about 1.2–5.0 moles base per mole of the sulfonium salt is desirable. Also a reactant ratio of 1.1–3.0 moles of aldehyde per mole of sulfonium salt is preferred for maximum yield.

REACTION CONDITIONS

The epoxidation process occurs in aqueous solution. Water is an effective solvent for most reactants. Indeed, preparation of the sulfonium salt is often carried out in aqueous solution and the resulting mixture can generally be used for epoxidation without isolation of the sulfonium salt. At times addition of a moderate amount of a water-soluble $C_1$–$C_6$ alcohol, such as methanol, ethylene glycol, 2-ethoxy ethanol, or 1,4-butanediol, is advantageous to increase the mutual solubility of the reactants.

In the preferred process a water-insoluble organic extractant is added to remove the epoxide from the aqueous phase as it is formed thereby minimizing hydrolysis and other side reactions. Particularly suitable as extractants are aliphatic and aromatic hydrocarbons such as hexane, heptane, cyclohexane, benzene, toluene, and petroleum refining fractions like kerosene and naphtha. $C_1$–$C_4$ chlorinated aliphatic hydrocarbons stable in aqueous alkali under the reaction conditions also are effective extractants. Typical are methylene chloride, carbon tetrachloride, methylchloroform, 1,2-dichloroethane and 1,2-dichloropropane. To facilitate recovery of the extracted epoxide an extractant having a boiling point in between the range from 30°–130° C. is often preferred.

Optimum conditions for a given epoxidation will, of course, depend upon the reactivity and stability of the reactants and product as well as the reaction concentrations and temperature. Usually the reaction occurs at 20°–100° C., preferably at 30°–80° C. Depending on the particular reactants, the reaction time can vary from a few minutes to several days. But often a substantial yield of epoxide is obtained in from 0.1–2.0 hours at 30°–80° C. A moderate superatmospheric pressure can be used if desired to maintain a liquid phase and minimize the loss of volatile material.

The scope of the present process for synthetically useful epoxidation by reaction of a trialkylsulfonium salt and an aromatic aldehyde in a strong aqueous base is broad. Yet, it is subject to recognized structural factors as well as specific reaction conditions. For example, decreasing the rate of the competing base-catalyzed reactions of the aldehyde will favor formation of the desired epoxide. Within the general scope of the disclosed process, optimum reaction conditions for a given epoxidation can be determined in a routine manner.

To illustrate further the present invention the following examples are given. Unless otherwise specified, all parts and percentages are by weight.

EXAMPLE 1

Styrene oxide (A) A mixture of 404 parts (6.5 moles) dimethyl sulfide, 908 parts (6.4 moles) methyl iodide and 432 parts of water was refluxed with stirring for 2 hours. The heavy white precipitate was recovered, washed with acetone and air dried to give a 71% yield of trimethylsulfonium iodide. A solution of 100 parts of the sulfonium salt in 140 parts of water was passed through a column of strong-base anion-exchange resin in chloride form. The eluent was concentrated to give a 5.5–5.6 N aqueous solution of trimethylsulfonium chloride.

(B) To a mixture of 29.7 parts (0.28 moles) benzaldehyde, 170 parts of benzene, 100 parts of n-propanol and 12 parts of water was added 50 parts (0.28 mole) 5.6 N aqueous trimethylsulfonium chloride. The mixture was stirred and heated to 50° C. Then 32 parts (0.39 mole) of 50% caustic was added rapidly. After refluxing for an hour at 70° C., the mixture was cooled and the organic phase separated. By a standard pyridine hydrochloride epoxide analysis, the benzene extract contained 26.0 parts styrene oxide, a 67% yield. Gas chromatography confirmed the styrene oxide yield and indicated about 15% unreacted benzaldehyde. Distillation gave 22 parts of a styrene oxide B.P. 69–73° C./10 mm. Hg having a minimum purity of 90%.

(C) Attempts to react the trimethylsulfonium chloride aqueous base with acetaldehyde or formaldehyde were unsuccessful because of rapid polymerization of the aldehyde.

EXAMPLE 2

1,2-epoxypropylbenzene (A) A mixture of 100 parts (1.11 mole) diethyl sulfide, 123 parts (1.11 mole) ethyl bromide and 100 parts of 95% ethanol and 35 parts water were heated at reflux for 20 hours. The aqueous phase was separated, extracted with benzene and analyzed. Conversion to triethylsulfonium bromide was about 30% with about 2.4% hydrolysis.

(B) To a well-stirred mixture of 100 parts (0.28 mole) of aqueous triethylsulfonium bromide, 31.8 parts (0.30 mole) benzaldehyde, 170 parts benzene and 70 parts 85% ethanol at 50° C. was added 33 parts (0.42 mole) 50% caustic. After refluxing for 2 hours at 70° C., the mixture was cooled and the organic phase recovered. By analysis it contained 25.5 parts of 1,2-epoxypropylbenzene, a 68% yield.

EXAMPLE 3

1,4-bis(epoxyethyl)benzene

Reaction of p-terephthalaldehyde with trimethylsulfonium chloride in aqueous caustic with toluene as an extractant gave a 50% yield of crude 1,4-bis(epoxyethyl)benzene. On standing the crude product partially crystallized. The epoxide analysis, infrared and NMR spectra of the solid product were consistent with its identification as 1,4-bis(epoxyethyl)benzene. This epoxide is useful in the preparation of polyesters (McGary et al. U.S. 2,917,493).

I claim:

1. A process for preparing aromatic epoxides which comprises: reacting in aqueous solution
   (A) a trialkylsulfonium salt of the formula $(RCH_2)_3S^+X^-$ 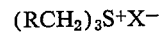

where each R individually is H or $CH_3$, and X is a counteranion;
   (B) an aromatic aldehyde, ArCHO; and
   (C) a water-soluble base having a $pK_a$ greater than 11.0 to form
   (D) an aromatic epoxide of the formula

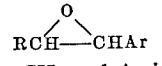

where R is H or $CH_3$ and Ar is the aromatic group of the aldehyde.

2. The process of claim 1 where the base is sodium hydroxide.

3. The process of claim 1 where a water-insoluble organic extractant is added to the reaction mixture to remove the epoxide from the aqueous phase as it is formed.

4. The process of claim 2 where the extractant is hydrocarbon or a $C_1$–$C_4$ chlorinated hydrocarbon, said extractant having a boiling point between about 30°–130° C.

5. The process of claim 1 wherein the sulfonium salt is a trimethylsulfonium halide.

6. The process of claim 1 wherein the sulfonium salt is a triethylsulfonium halide.

7. The process of claim 1 where trimethylsulfonium chloride is reacted with benzaldehyde in the presence of aqueous sodium hydroxide to yield styrene oxide.

8. The process of claim 1 where triethylsulfonium bromide is reacted with benzaldehyde in the presence of aqueous sodium hydroxide to yield 1,2-epoxypropylbenzene.

9. The process of claim 1 where trimethylsulfonium chloride is reacted with p-terephthaladehyde in aqueous sodium hydroxide to yield 1,4-bis(epoxyethyl)benzene.

References Cited

Corey et al., JACS, 74, 3782 (1962).
Franzen et al., Tetrahedron Letters, 661 (1962).
Franzen et al., Berichte, 1881 (1964).

NORMA S. MILESTONE, *Primary Examiner.*

U.S. Cl. X.R.

260—607, 609, 652.5, 971